US006620458B2

(12) United States Patent
Poco et al.

(10) Patent No.: US 6,620,458 B2
(45) Date of Patent: Sep. 16, 2003

(54) METHOD TO PRODUCE ALUMINA AEROGELS HAVING POROSITIES GREATER THAN 80 PERCENT

(75) Inventors: John F. Poco, Livermore, CA (US); Lawrence W. Hrubesh, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 7 days.

(21) Appl. No.: 09/970,251

(22) Filed: Sep. 27, 2001

(65) Prior Publication Data

US 2003/0060519 A1 Mar. 27, 2003

(51) Int. Cl.$^7$ .............................. B01J 13/00; B05D 5/00; C01F 7/02; E04B 1/74
(52) U.S. Cl. .................... 427/246; 252/62; 423/628; 423/630; 501/12; 501/85; 516/112
(58) Field of Search ................... 516/112; 501/12, 501/85; 423/628, 630; 252/62; 427/246

(56) References Cited

U.S. PATENT DOCUMENTS

| | | | | | |
|---|---|---|---|---|---|
| 2,188,007 A | * | 1/1940 | Kistler | .................. | 252/62 |
| 2,268,251 A | * | 12/1941 | Haux | .................. | 501/85 |
| 3,944,658 A | * | 3/1976 | Yoldas | .................. | 423/630 X |
| 5,064,783 A | * | 11/1991 | Luckevich | .................. | 501/12 |
| 5,395,805 A | * | 3/1995 | Droege et al. | .......... | 423/630 X |
| 5,409,683 A | * | 4/1995 | Tillotson et al. | ............. | 423/338 |
| 5,439,851 A | * | 8/1995 | Han | .................. | 501/12 |
| 6,030,599 A | * | 2/2000 | Noweck et al. | ......... | 423/628 X |
| 6,284,682 B1 | * | 9/2001 | Troczynski et al. | ............. | 501/12 |
| 6,383,443 B1 | * | 5/2002 | Jeng et al. | ................ | 501/12 X |

OTHER PUBLICATIONS

B.E. Yoldas, Am, Ceramic So. Bull., vol. 54, No. 3, (1975) 286–288.
Y. Mizushima et al., J. Mater, Res. 8 (1993) 2993–2999.
UCRL–JC–137749, J.F. Poco et al., Synthesis of High Porosity, Monolithic Alumina Aerogels, Oct. 9, 2000.
B.E. Yoldas, Ceramic Bulletin, vol. 54, No. 3 (1975) 289–290.

* cited by examiner

Primary Examiner—Richard D. Lovering
(74) Attorney, Agent, or Firm—L. E. Carnahan; Ann M. Lee; Alan H. Thompson

(57) ABSTRACT

A two-step method for producing monolithic alumina aerogels having porosities of greater than 80 percent. Very strong, very low density alumina aerogel monoliths are prepared using the two-step sol-gel process. The method of preparing pure alumina aerogel modifies the prior known sol method by combining the use of substoichiometric water for hydrolysis, the use of acetic acid to control hydrolysis/condensation, and high temperature supercritical drying, all of which contribute to the formation of a polycrystalline aerogel microstructure. This structure provides exceptional mechanical properties of the alumina aerogel, as well as enhanced thermal resistance and high temperature stability.

17 Claims, 1 Drawing Sheet

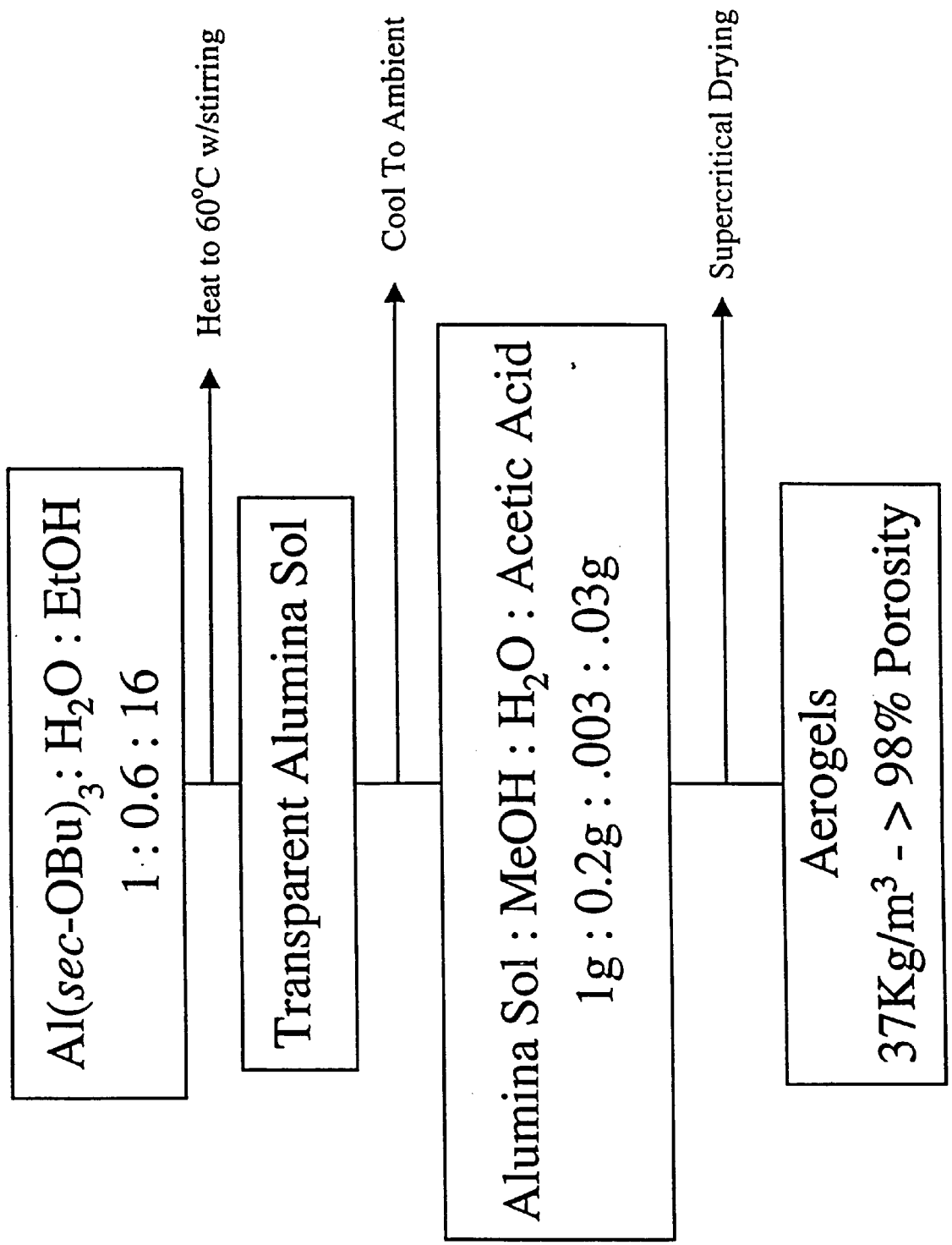

METHOD TO PRODUCE ALUMINA AEROGELS HAVING POROSITIES GREATER THAN 80 PERCENT

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to alumina aerogels, particularly to a method for producing strong, low density, high porosity, alumina aerogel monoliths, and more particularly to a two-step sol-gel method of preparing high porosity, pure, alumina aerogel by combining the use of substoichiometric water for hydrolysis, the use of acetic acid to control hydrolysis/condensation, and high temperature supercritical drying.

Alumina-based ceramics, in addition to their relatively high strength, are noted for their enhanced thermal and chemical stability. These properties of alumina have been shown to also apply to low density aerogel materials. To date, the major use for alumina-based aerogels is as high temperature, high surface area catalyst supports. Monolithic alumina aerogels, which have been difficult to produce by current synthetic procedures, would be capable of providing thermal insulation over a larger temperature range than the more common silica aerogels and would be a useful material for many applications, such as for alumina aerogel crucibles of use in improved high temperature alloy melt processing.

It is very difficult to manufacture alumina ($Al_2O_3$) aerogels in monolithic form, since alumina aerogels usually react with moisture in air and ultimately fall apart.

The sol-gel synthesis of alumina gels has been well studied and it has been found that the complex solution chemistry of aluminum hydroxide complicates the structural formation of the gel. It has been shown that there are several possible structural variations in the aluminum alkoxide derived gels. Some of the variables that affect the final structure of the gel include: the type of alkoxide used, the ratio of alkoxide to water, the rate of hydrolysis, the temperature of drying, the type of catalyst used, the pH of the solution, and the temperature at which the reactions occur. The final form of the aerogel may be monolithic or powder, amorphous or crystalline, or biphasic, heterogenous or homogenous.

Considerable work has been carried out and papers published for both pure alumina aerogels and composite alumina-silica aerogels. See UCRL-JC-137749, J. F. Poco et al, Synthesis of High Porosity, Monolithic Alumina Aerogels, Oct. 9, 2000. The synthesis of monolithic, stable, high porosity alumina aerogels has been found to be especially difficult due to the complex chemical pathways leading to gelation, the susceptability to cracking during drying, and the hygroscopic nature of the dried material. Only few papers describe the formation of truly monolithic aerogels containing alumina, and the highest porosity, pure alumina aerogel reported was ~95% porous (see Y. Mizushima et al, J. Non-Crystalline Solids 167 [1994]1).

There is a need for very high porosity (>95%) monolithic alumina aerogels for space applications. Thermal protection is needed for space vehicles and thermal insulation is required for many of the experiment assemblies. Monolithic alumina aerogels could be used separately or they could be added to other thermal protection materials to make composites with superior thermal resistance properties. For space applications, lightweight is the most important requirement, thermal resistance is next, and finally robustness and stability.

The method of the present invention produces monolithic aerogels that exhibit all of the above-referenced features. The monolithic gels or the present invention are made in two steps: first, an alumina sol is made, and second, the sol is gelled. The alumina sol is made following a variation of the Yoldas procedure (see B. E. Yoldas, Am. Ceramic Soc. Bull., Vol. 54, No. 3 [1975] 286), using less than the stoichiometric amount of water instead of a large water excess, as in Yoldas. The method of this invention is similar to the method reported by Himmel et al, J. Non-Crystalline Solids 186 (1995) 149, with some variations in the chemistry and the drying.

SUMMARY OF THE INVENTION

It is an object of the present invention to provide high porosity (>95%), monolithic, alumina aerogels.

A further object of the invention is to provide a method for producing high quality alumina aerogels.

A further object of the invention is to provide a method for producing alumina aerogels which are superior in their ability to withstand temperature of 1000° C. and not shrink.

Another object of the invention is to provide a method for producing monolithic, high porosity, alumina aerogels with a change in the linear dimensions (shrinkage) of less than 2%.

Another object of the invention is to provide a method for producing strong, low density alumina aerogel monoliths using a two-step sol-gel process which combines the use of substoichiometric water for hydrolysis, the use of acetic acid to control hydrolysis/condensation, and high temperature supercritical drying.

Another object of the invention is to provide a two-step method for producing strong, low density, high porosity alumina aerogel monoliths which have a polycrystalline aerogel microstructure.

Another object of the invention is to provide a method for producing alumina monoliths having low thermal conductivity up to 800° C. and do not undergo structural changes up to 1050° C.

Other objects and advantages of the present invention will become apparent from the following description and accompanying drawing. The present invention involves the synthesis of high porosity, monolithic, alumina aerogels. The method is a two-step sol-gel operation wherein pure alumina aerogels are produced having a porosity of greater than 95%. The alumina aerogels thus produced have a polycrystalline morphology and have physical properties superior to those of silica aerogels for equivalent densities, and include greater mechanical strength, lower density/greater porosity, enhanced thermal resistance, lower thermal conductivity up to 800° C., and resistance to structural changes up to 1050° C. Applications for the alumina aerogels produced by the method of this invention include high surface area catalyst supports capable of high temperature, thermal insulation over a wider range than possible with silica aerogels, and space applications-light-weight thermal insulation. The monolithic alumina gels are made in two-steps: first an alumina sol is made, then the sol is gelled in the second step. The alumina sol is made following a variation of the Yoldas procedure, referenced above, using less than the stoichiometric amount of water instead of a large water excess, the use of acetic acid, and high temperature supercritical drying, which contribute to the formation of a polycrystalline aerogel microstructure.

BRIEF DESCRIPTION OF THE DRAWING

The accompanying drawing, which is incorporated into and forms a part of the disclosure, illustrates an embodiment of the method of the invention and, together with the description, serves to explain the principles of the invention.

The single FIGURE illustrates the two-step method of the present invention.

DETAILED DESCRIPTION OF THE INVENTION

The present invention is directed to high porosity, monolithic, alumina aerogels and to a method for producing such aerogels is a porosity of greater than 95%, which utilizes a two-step sol-gel process. The alumina aerogels having a polycrystalline morphology that results in enhanced physical properties which are superior to those for silica aerogels for equivalent densities. The monolithic alumina aerogels made by the two-step operation of this invention are robust and moisture stable, and thus strong, stable, monolithic alumina aerogels can be produced with a porosity of >98%. The monolithic gels are made in two steps: first an alumina sol is made, then the sol is gelled in the second step. The alumina sol is made following a variation of the above-referenced Yoldas' procedure, using less than the stoichiometric amount of water for hydrolysis instead of the large water excess previously used; and in addition, uses acetic acid to control hydrolysis/concentration, and high temperature supercritical drying.

All of these procedures contribute to the formation of a polycrystalline aerogel microstructure. This microstructure is responsible for the exceptional mechanical properties of the alumina aerogel, as well as the enhanced thermal resistance and high temperature stability. The thus produced monoliths exhibit excellent insulating and refractory behavior, having low thermal conductivity up to 800° C. and the monoliths do not undergo significant structural changes up to 1050° C. In addition, shrinkage during drying is less than about 2%.

The chemicals for the preparation of the high porosity monolithic, alumina aerogels are as follows: aluminum tri-sec-butoxide 97% from Aldrich, ethanol-absolute (200 proof) from AAPER, acetic acid (glacial) from EM Sciences, and methanol ACS Grade 99.8% from Aldrich. In the first step, a sol is made by mixing aluminum secondary butoxide, 200 proof ethanol and DI water in a molar ratio of {Al(sec-OBu)$_3$:EtOH:H$_2$O=1:16:0.6}, and heating to 60° C. while stirring for 45 minutes. The mixture is initially cloudy but it turns clear after the onset of hydrolysis. The clear sol solution is then cooled to room temperature. In the second step, the gel is made by mixing a portion of the sol solution with methanol, water, and acetic acid. The amounts for this mixture are determined by the targeted porosity of the final aerogel. For example, for a targeted porosity of 98.5%, the weight ratio is {Sol:MeOH:H$_2$O=1 g:0.2 g:0.003 g} and the amount of acetic acid is 1 ml for each 30 ml of the mixture. The mixture is stirred for 30 minutes, then poured into molds where the gel typically forms within 120 minutes.

The gels are dried by supercritical extraction (SCE) of methanol, in an autoclave at 300° C. and 12.2 MPa pressure. The autoclave is evacuated after decompression, while cooling. The above described process is illustrated in the single FIGURE drawing.

The following sets forth a specific example of the method of the invention wherein the alumina sol is incorporated into a composite material, followed by supercritical drying, and is set forth under the following subheadings:

Preparation of Alumina Sol 127 grams Aluminum tri-sec-butoxide (246 g/mole) was added to a 375 gram solution of 200 proof ethanol containing 5 grams of water. The aluminum is stirred gently and heated to 60 degrees centigrade. A clear sol is formed which is used as the base material in the following reactions. The sol can then be poured into a mold to make monoliths or dropped into an immiscible fluid to make spheres, or wicked into other structures to form composites with them.

An Example to Make a Composite Material

Thermal protection tiles are filled with sol-gel precursor and then supercritically dried. A mixture of 60 grams of methanol, 1 gram water, and 20 milliter of acetic acid (glacial) is added to a 300 gram Alumina sol solution. The sol-gel solution of Alumina is mixed thoroughly and used to infiltrate the tiles. Tiles are slowly immersed into sol-gel solution and then placed into a vacuum chamber. The tile/solution are reduced in pressure until boiling is noticed then held for 3–5 min. Tiles are then removed and placed into a suitable extraction container.

Supercritical Drying

The thermal protection tile is within the "sealed" mold. The assembly is placed within the autoclave and pressurized to 2000 psi. Heat is applied to reach the supercritical conditions of methanol/ethanol. Heating rate is 2 degrees C./min to a temperature of 310 deg C. The autoclave is depressurized to ambient pressure at a rate of 50 psi/min while maintaining the critical temperature. The autoclave is placed under vacuum at the end of depressurization and the heat turned off. The autoclave is either force cooled or left to cool naturally.

Scanning electron micrographs (SEM) were obtained on uncoated specimens using a Hitachi S-800 instrument. The dry aerogel was analyzed with 20 kv beam voltage for a sufficiently short time to limit charging of the sample. High resolution transmission electron micrographs (HRTEM) were obtained on a Philips CM300 FEG instrument, operating at 300 kV. Flecks from the dry sample were dropped onto a holey carbon film and analyzed directly.

The thermal conductivity was measured with a heat flux-meter operating in a temperature range of 30–50° C. This non-commercial instrument was calibrated using NIST traceable standards. The high temperature thermal conductivity measurements were made by Energy Materials Testing Laboratory, Biddeford, Me., using a guarded hot plate apparatus, according to the ASTM C 177 procedure.

Sound velocity measurements were made using a Panametrics Ultrasonic Analyzer Model 5052UA with 180 kHz center frequency transducers. The monolithic aerogel specimens were prepared with flat, parallel surfaces, with 1.5 cm thickness. The elastic modulus of the aerogels was calculated from the densities and the measured longitudinal and shear sound velocities.

Surface area measurements were made on a Micromeritics L3000 Analyzer, using the BET nitrogen adsorption/desorption technique.

The unusual morphology of the SCE dried alumina aerogel were shown in SEM and HRTEM mircographs. Electron diffraction of the aerogel showed distinct ring patterns indicating an ordered structure. The alumina aerogel exhibits a polycrystalline morphology which can be seen as randomly oriented patches of ordered planes in the HRTEM. The microstructure consists of randomly connected acicular, leaf-like particles, quite different from the typical morphology of colloidal, amorphous aerogel that consists of interconnected spheroidal particles. The SEM and HRTEM micrographs are illustrated in above-referenced UCRL-JC-137749.

The measured thermal conductivity values at 1 atm. pressure for the alumina aerogel are 0.029W/mK at 30° C., 0.058W/mK at 400° C., and 0.098 at 800° C. These values are compared in Table 1 with values for silica aerogels of the same nominal density, made by two separate methods, base catalyzed (BC) and two-step acid/base catalyzed (ABC). The thermal resistance of the alumina aerogel is clearly superior to the silica aerogels at elevated temperatures.

TABLE 1

| Aerogel Type | Density Kg/m$^3$ | Elastic Modulus (Kpa) | Thermal Conductivity (mW/mK) @1 atm | | | Specific Surface Area (m$^2$/g) |
| --- | --- | --- | --- | --- | --- | --- |
| | | | 30° C. | 400° C. | 800° C. | |
| Alumina | 37 | 550 | 29 | 58 | 98 | 376 |
| Silica (BC) | 40 | 434 | 31 | 122 | — | 574 |
| Silica (ABC) | 39 | 489 | 33 | 106 | — | 649 |

Unlike the silica aerogels that shrink at temperatures as low as 600° C., the monolithic alumina aerogels do not sinter until >950° C. Several monoliths of the alumina aerogel were heated in furnace at 1050° C. for 4 hours, then cooled to room temperature. The dimensions were measured before and after the heat treatment. The change in the linear dimensions for the monoliths were less than 2%. This result is consistent with similar results for aluminum-silicate aerogel compositions that have high alumina content.

The isotherm plot for nitrogen adsorption/desorption on the alumina aerogel is a Type II. The specific surface area determined from the desorption curve is 376 m$^2$/g. The specific surface areas of several types of aerogels are compared in Table 1. The relatively low value for alumina aerogel is attributed to the leaf-like morphology, compared with the colloidal morphology for high porosity silica aerogels.

The elastic modulus of the alumina aerogel (550 KPa) is determined from the measured longitudinal (158 m/s) and shear (87 m/s) sound velocities. As can be seen in Table 1, the elastic modulus of the very high porosity alumina aerogel is higher than for silica aerogels having the same nominal density.

The alumina aerogels produced by this procedure are mostly crystalline, in contrast with most common aerogels, which are mostly amorphous. Some crystallinity of the alumina aerogel is expected based on the observation by others of the sol-gel formation in aluminum alkoxide systems. Yoldas' method to make sols at elevated temperatures is known to produce particles with the boehmite phase, see Y. Mizushima et al, J. Mater. Res. 8 (1993) 2993. Also, it is known that supercritically drying the gels at high temperature can convert the gels to the boehmite phase and the degree of conversion of the pseudoboehmitic phase depends on the time held at temperature in the autoclave. Mizushima and Hori observed the formation of boehmite 'fibrils' in aerogels that were dried at 270° C. in an autoclave, see J. Non-Crystalline Solids 167 (1994)1.

This crystalline form prevented sintering until higher temperatures and caused strengthening of the alumina aerogels. In addition, it is reported by Mizushima and Hori that the degree of crystallinity in pure alumina aerogels depends on the alcohol used as a solvent.

The transmission electron diffraction data from the alumina aerogel shows peaks that do not match either the boehmite or bayerite phase for alumina. We have not made measurements to determine the crystal composition. It is possible that the crystal structure matches that of $Al(OEt)_3$ as was proposed by Himmel, et al, referenced above, for gel preparations similar to ours. They also observed flat, disc-like regions in their alumina aerogels, which appear to be similar to the leaf-like character for our alumina aerogels.

The degree of crystallinity of the aerogel produced by procedure of this invention is very high; estimated from the HRTEM images to be >90%. We believe that this is due to a combination of effects. We use a substoichiometric amount of water and no acid is added in the first step. We used acetic acid in the second step, which releases water with reactions with alcohol and allows control of the hydrolysis rates. Finally, we carry out the supercritical extraction in an autoclave at elevated temperature and pressure.

While the very low density aerogels are all quite fragile materials, the high degree of crystallinity of the structure leads to increased strength of the alumina aerogel. The modulus of the alumina aerogel is 12–26% higher than silica aerogels having similar density. The crystalline structure and the highly connected, leaf-like morphology are also responsible for the enhanced thermal and mechanical properties. Yoldas (Chemical Processing of Advanced Materials, ed. L. Henoh et al, John Wiley and Sons, Inc. [19929] 60) points out that the physical properties, such as melting point, viscosity, mechanical behavior and capability of the network to remain monolithic (during drying or consolidation) of the dried gels, depends on high connectivity in the network. The low value for the thermal conductivity measured for the alumina aerogel, is again due to the high degree of connectivity of the gel network.

Attempts to make low density, monolithic alumina gels using Yoldas' above-referenced method with large excess water were not successful, either by supercritical drying in $CO_2$ or by autoclave drying. The gels were either not monolithic as removed from the dryer, or they converted to powder after exposure to atmosphere moisture. The apparent conversion of the gels to bayerite phase could cause the instability to atmospheric moisture.

Acetic acid was chosen for the gelation step because its reactions liberate water in alcohol solutions, thus offering a means to control hydrolysis-condensation reaction rates. Reaction rates are especially critical for the formation of homgeneous gels from highly reactive or partially hydrolyzed alkoxides.

It has thus been shown that strong, low density alumina aerogel monoliths can be prepared using the two-step sol-gel method of the present invention. This is accomplished by modification of the prior known processes which involves combining the use of substoichiometric water for hydrolysis, the use of acetic acid to control hydrolysis/condensation, and high temperature supercritical drying. All of these modified procedures contribute to the formation of a polycrystalline aerogel microstructure which is responsible for the exceptional mechanical properties of the alumina aerogel, as well as the enhanced thermal resistance and high temperature stability. The alumina aerogels produced by the two-step method of this invention are robust and moisture stable, as well as having a porosity of over 95%, with aerogels produced having a porosity of 98.5% which enables the use for thermal protection for space vehicles, for example.

While specific embodiments, materials, parameters, etc. have been described and/or illustrated to exemplify and teach the principles of the invention, such are not intended to be limiting. Modifications and changes may become apparent to those skilled in the art, and it is intended that the invention be limited only by the scope of the appended claims.

What is claimed is:

1. A method for producing alumina aerogels having a porosity of greater than 95%, comprising: providing a solution composed of aluminum tri-sec-butoxide, ethanol and water, to form an alumina sol solution, stirring and heating the mixture, providing a mixture of methanol, water, and acetic acid, forming a mixture of the alumina sol solution with the mixture of methanol, water, and acetic acid, stirring the mixture, allowing the mixture to gel, and supercritically drying the gelled mixture.

2. The method of claim 1, wherein providing the solution is carried out mixing the aluminum tri-sec-butoxide with 200 proof ethanol and distilled water in a molar ratio of {Al(sec-OBu)$_3$:EtOH:H$_2$O=1:16:0.6}.

3. The method of claim 1, wherein the stirring of the solution is carried out for a time period of about 45 minutes.

4. The method of claim 1, wherein the heating is carried out to a temperature of 60° C.

5. The method of claim 1, wherein the stirring of the solution is carried out for about 45 minutes and the heating is to 60° C.

6. The method of claim 1, additionally including cooling the alumina sol solution to room temperature prior to forming the mixture.

7. The method of claim 1, wherein stirring the mixture is carried out for about 30 minutes.

8. The method of claim 1, additionally including pouring the mixture into molds prior to allowing the mixture to gel.

9. The method of claim 1, wherein gellation of the mixture occurs within 120 minutes.

10. The method of claim 1, wherein the supercritical drying is carried out by extraction of the methanol in an autoclave at 300° C. and 12.2 MPa pressure, followed by decompression and evacuation while cooling.

11. The method of claim 1, additionally including determining a targeted porosity of the aerogel, to be formed, and mixing a determined amount of the alumina sol solution with the mixture of methanol, water, and acetic acid.

12. The method of claim 11, wherein the targeted porosity is 98.5%, the weight ratio of the mixture is {Sol:MeOH:H$_2$O=1 g:0.2 g:0.003 g}, and the amount of acetic acid is 1 ml for each 30 ml of the mixture.

13. A method for preparation of an alumina sol, comprising: adding 127 grams aluminum tri-sec-butoxide to a 375 gram solution of 200 proof ethanol containing 5 grams water and acetic acid, stirring the solution and heating the solution to 60° C., and additionally including one of the group consisting of pouring the solution into a mold to form monoliths, dropping the solution into an immiscible fluid to make spheres, and wicking the solution into other structures to form composites therewith.

14. A method for preparation of, filled thermal protective tiles, comprising: adding 127 grams aluminum tri-sec-butoxide to a 375 gram solution of 200 proof ethanol containing 5 grams water and acetic acid, stirring the solution and heating the solution to 60° C., and additionally including providing thermal protective tiles, filling the tiles with the thus formed alumina sol, and then supercritically drying the thus filled thermal protective tiles.

15. The method of claim 14, additionally including providing a mixture of 60 grams of methanol, 1 gram water, and 20 milliter of acetic acid (glacial), adding the mixture to 300 gram alumina sol solution, and mixing the sol solution and mixture.

16. In a method for producing alumina aerogels using a sol-gel process, the improvement comprising: using a two-step sol-gel process, a first step comprising making an alumina sol, and then gelling the sol in the second step, followed by supercritical drying, said gelling the sol being carried out by mixing at least a portion of the alumina sol with methanol, water, and acetic acid, and stirring the mixture for a time period.

17. The improvement of claim 16, wherein making an alumina sol is carried out by mixing aluminum tri-sec-butoxide, 200 proof ethanol, and distilled water.

* * * * *